United States Patent
Iwabuchi

(10) Patent No.: US 7,539,805 B2
(45) Date of Patent: May 26, 2009

(54) BUS ARBITRATION METHOD AND COMPUTER-READABLE MEDIUM

(75) Inventor: Hiroshi Iwabuchi, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 240 days.

(21) Appl. No.: 11/513,210

(22) Filed: Aug. 31, 2006

(65) Prior Publication Data

US 2007/0204083 A1 Aug. 30, 2007

(30) Foreign Application Priority Data

Sep. 5, 2005 (JP) ............................ P2005-256679

(51) Int. Cl.
- G06F 13/36 (2006.01)
- G06F 13/362 (2006.01)
- G06F 13/368 (2006.01)
- G06F 13/14 (2006.01)
- G06F 13/38 (2006.01)

(52) U.S. Cl. .................. 710/116; 710/123; 710/241; 710/244; 718/102; 718/103; 718/104

(58) Field of Classification Search ................ 710/113, 710/116, 240, 241, 242, 244, 118–119, 123, 710/125; 718/100, 102, 104, 103
See application file for complete search history.

(56) References Cited

U.S. PATENT DOCUMENTS

| | | | | |
|---|---|---|---|---|
| 5,740,380 A | * | 4/1998 | LaBerge et al. | 710/107 |
| 5,771,358 A | * | 6/1998 | LaBerge | 710/107 |
| 6,658,512 B1 | * | 12/2003 | Gokulrangan | 710/117 |
| 7,054,970 B2 | * | 5/2006 | Kim | 710/113 |
| 7,096,293 B2 | * | 8/2006 | Lee | 710/244 |
| 2003/0105911 A1 | * | 6/2003 | Jones | 710/309 |
| 2004/0010646 A1 | * | 1/2004 | Kim | 710/116 |
| 2005/0228927 A1 | * | 10/2005 | Garcia | 710/305 |

FOREIGN PATENT DOCUMENTS

| JP | 5-233525 | | 9/1993 |
|---|---|---|---|
| JP | 2003006146 A | * | 1/2003 |

OTHER PUBLICATIONS

"The Authoritative Dictionary of IEEE Standards Terms". Seventh Edition. 2000. The Institute of Electrical and Electronics Engineers, Inc. IEEE Press. ISBN 0-7381-2601-2. p. 48.*

* cited by examiner

*Primary Examiner*—Thomas J Cleary
(74) *Attorney, Agent, or Firm*—McGinn IP Law Group, PLLC

(57) ABSTRACT

A bus arbitration method for arbitrating a bus in a computer capable of executing a plurality of tasks by a plurality of devices connected to the bus is provided and includes: acquiring a task information at a timing, the information containing a priority of each of the tasks and a usage rate of each of the devices for executing each of the tasks; producing an information of a bus use condition of each of the devices on the basis of the priority and the usage rate so that that the bus is preferentially assigned to a device necessary to execute a task having high priority; and arbitrating the bus between the devices according to the information of the bus use condition.

20 Claims, 6 Drawing Sheets

| DEVICE ID | PRESENCE OR ABSENCE OF BUS USE REQUEST | BUS CYCLE NUMBER OF CONTINUOUS USE | EXECUTION PERIOD |
|---|---|---|---|
| DEVICE A | PRESENCE | 4 CYCLES | 3 |
| DEVICE B | ABSENCE | 16 CYCLES | 2 |
| DEVICE C | PRESENCE | 32 CYCLES | 10 |

FIG. 4

|  | USAGE RATE OF DEVICE A | USAGE RATE OF DEVICE B | USAGE RATE OF DEVICE C | AMOUNT OF BUS USE PER UNIT TIME |
|---|---|---|---|---|
| TASK X | 40% | 30% | 30% | 50 |
| TASK Y | 60% | 40% | 0% | 60 |
| TASK Z | 90% | 0% | 10% | 10 |

FIG. 5

| DEVICE ID | MINIMUM BUS CYCLE NUMBER |
|---|---|
| DEVICE A | 4 CYCLES |
| DEVICE B | 16 CYCLES |
| DEVICE C | 32 CYCLES |

FIG. 6

| DEVICE ID | BUS CYCLE NUMBER OF CONTINUOUS USE (CYCLES) | EXECUTION PERIOD |
|---|---|---|
| DEVICE A | 132 | 1 |
| DEVICE B | 80 | 1 |
| DEVICE C | 32 | 1 |

FIG. 7

| DEVICE ID | BUS CYCLE NUMBER OF CONTINUOUS USE (CYCLES) | EXECUTION PERIOD |
|---|---|---|
| DEVICE A | 4 | 1 |
| DEVICE B | 16 | 1 |
| DEVICE C | 32 | 1 |
| DEVICE A | 4 | 1 |
| DEVICE B | 16 | 1 |
| DEVICE A | 4 | 1 |
| DEVICE B | 16 | 1 |
| DEVICE A | 4 | 1 |
| DEVICE B | 16 | 1 |
| DEVICE A | 4 | 1 |
| DEVICE B | 16 | 1 |
| DEVICE A | 27 × 4 | 1 |

FIG. 8

| DEVICE ID | BUS CYCLE NUMBER OF CONTINUOUS USE (CYCLES) | EXECUTION PERIOD |
|---|---|---|
| DEVICE A | 6 × 4 | 1 |
| DEVICE B | 16 | 1 |
| DEVICE C | 32 | 1 |
| DEVICE A | 6 × 4 | 1 |
| DEVICE B | 16 | 1 |
| DEVICE A | 6 × 4 | 1 |
| DEVICE B | 16 | 1 |
| DEVICE A | 6 × 4 | 1 |
| DEVICE B | 16 | 1 |
| DEVICE A | 9 × 4 | 1 |
| DEVICE B | 16 | 1 |

FIG. 9

| DEVICE ID | BUS CYCLE NUMBER OF CONTINUOUS USE (CYCLES) | EXECUTION PERIOD |
|---|---|---|
| DEVICE A | 4 | 1 |
| DEVICE B | 16 | 7 |
| DEVICE C | 32 | 33 |

FIG. 10

|  | USAGE RATE OF DEVICE A | USAGE RATE OF DEVICE B | USAGE RATE OF DEVICE C | AMOUNT OF BUS USE PER UNIT TIME |
|---|---|---|---|---|
| TASK X | 40% | 30% | 30% | 75 |
| TASK Y | 60% | 40% | 0% | 30 |
| TASK Z | 90% | 0% | 10% | 5 |

FIG. 11

| DEVICE ID | BUS CYCLE NUMBER OF CONTINUOUS USE (CYCLES) | EXECUTION PERIOD |
|---|---|---|
| DEVICE A | 72 | 1 |
| DEVICE B | 48 | 1 |
| DEVICE C | 32 | 1 |

FIG. 12

| DEVICE ID | BUS CYCLE NUMBER OF CONTINUOUS USE (CYCLES) | EXECUTION PERIOD |
|---|---|---|
| DEVICE A | 4 | 1 |
| DEVICE B | 16 | 6 |
| DEVICE C | 32 | 18 |

BUS ARBITRATION METHOD AND COMPUTER-READABLE MEDIUM

BACKGROUND OF THE INVENTION

1. Field of the Invention

The present invention relates to a bus arbitration method and a computer-readable medium including a set of instructions for bus arbitration, which are for a computer executing a plurality of tasks by a plurality of devices connected to a bus and are used as a real-time multi-task OS.

2. Description of Background Art

In an input/output processing device containing a CPU, multi-tasks are usually processed sequentially starting from a task having the highest priority. Practically, however, there may be a case where a bus connecting the CPU to respective devices is used for another processing and an aimed task is not processed preferentially so that an execution of the aimed task has to stand by.

Among input/output processing devices in the background art, there is a device in which, instead of a task to be processed, other tasks, which can be easily executed, are appropriately assigned to continuously utilize a bus, which is in use currently, to thereby improve efficiency of processing (for example, JP-A-5-233525).

Although it is preferable to improve the processing efficiency as a whole, in such a device, tasks having high priorities can not be executed rapidly by such assignment of bus.

SUMMARY OF THE INVENTION

An object of an illustrative, non-limiting embodiment of the invention is to provide a bus arbitration method and a computer-readable medium including a set of instructions for bus arbitration, which are capable of shortening time period up to an execution of task having high priority.

According to one aspect of the present invention, there is provided a bus arbitration method for performing an arbitration of a bus between a plurality of devices connected to the bus in a computer capable of executing a plurality of tasks by the devices, the method including: acquiring a task information at a timing, the information containing a priority of each of the tasks and a usage rate of each of the devices for executing each of the tasks; producing an information of a bus use condition of each of the devices on the basis of the priority and the usage rate so that that the bus is preferentially assigned to a device necessary to execute a task having high priority; and arbitrating the bus between the devices according to the information of the bus use condition.

According to the above method, since the bus is assigned preferentially to the device executing the task having high priority, it is possible to shorten the time period up to the execution of the task.

Further, in a bus arbitration method according to one aspect of the present invention, the priority of a task is defined by the number of bus cycles to be activated per unit time in executing the task, and the producing of the information of the bus use condition includes: calculating a bus usage rate of each of the devices on the basis of the number of bus cycles and the usage rate, wherein the bus usage rate of a device is a ratio of the number of bus cycles to be activated by the device per unit time to a total number of bus cycles of the plurality of the tasks; calculating the continuous use number of bus cycles on the basis of the bus usage rate and the minimum number of bus cycles that is the number of bus cycles capable of being activated by a device in a minimal level, wherein the continuous use number is the maximum number of bus cycles capable of being activated by a device in one use of the bus assigned to the device; and producing the information of the bus use condition on the basis of the continuous use number of bus cycles.

A bus arbitration method according to one aspect of the present invention may further includes determining whether each of the devices has a request of use of the bus, wherein in the arbitrating of the bus, the bus is not assigned to a device that is determined as having no request of use of the bus.

According to this method, since the bus is not assigned to the device having no request of bus use, unnecessary bus assignment is prevented and degradation of processing efficiency can be prevented.

In a bus arbitration method, the timing is a timing with which the priority is changed.

According to this method, since the bus use condition information is updated even in a case where the priority of the task is dynamically changed during the execution of task, the bus use condition of the device is suitably and appropriately defined correspondingly to the execution of the task and, therefore, it is possible to shorten the time period up to the execution of the task.

A bus arbitration method according to one aspect of the present invention may further include setting the priority in such a way that a task, which is under execution at a time when the task information is acquired, has the highest priority.

According to this bus arbitration method, it is possible to shorten the execution time of a task by appropriately weighting the priority of the task, which is under execution at a time when the task information is acquired.

According to one aspect of the present invention, there is provided a computer-readable medium including a set of instructions for arbitrating a bus between a plurality of devices connected to the bus in a computer capable of executing a plurality of tasks by the devices, the instructions including acquiring a task information at a timing, the information containing a priority of each the tasks and a usage rate of each of the devices for executing each of the tasks; producing an information of a bus use condition of each of the devices on the basis of the priority and the usage rate so that the bus is preferentially assigned to a device necessary to execute a task having high priority; and arbitrating the bus between the devices according to the information of the bus use condition. A control program corresponding to the set of instructions may be installed in a computer to execute each of the above steps.

BRIEF DESCRIPTION OF THE DRAWINGS

The features of the invention will appear more fully upon consideration of the exemplary embodiments of the invention, which are schematically set forth in the drawings, in which:

FIG. 4 conceptually shows task information;

FIG. 5 conceptually shows minimum bus cycle number information of every device;

FIG. 6 conceptually shows an information table of bus use condition prepared on a basis of calculations;

FIG. 7 conceptually shows an information table of bus use condition prepared on a basis of calculations;

FIG. 8 conceptually shows an information table of bus use condition prepared on a basis of calculations;

FIG. 9 conceptually shows an information table of bus use condition prepared on a basis of calculations;

FIG. 10 conceptually shows a task information when an amount of bus use is weighted such that a task X currently under execution is preferential;

FIG. 11 conceptually shows an information table of bus use condition prepared on a basis of calculations; and FIG. 12 conceptually shows an information table of bus use condition prepared on a basis of calculations.

DETAILED DESCRIPTION OF THE EXEMPLARY EMBODIMENTS

Although the invention will be described below with reference to the exemplary embodiments thereof, the following exemplary embodiments and modifications do not restrict the invention It is considered that the assignment of bus to the devices used to execute task having high priority is not appropriately performed by only the priority order of task. That is, when the bus arbitration is performed such that the bus is assigned preferentially to the device executing the task having high priority, the time period up to the execution of the task may be shortened.

According to an exemplary embodiment, it is possible to provide a bus arbitration method and a bus arbitration program capable of shortening time period up to an execution of task having high priority.

Figures 1, 2:
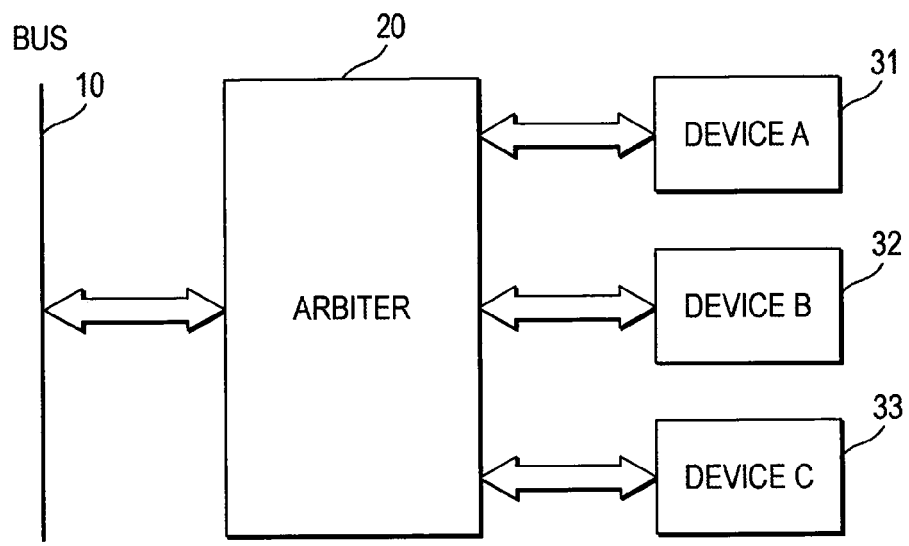
FIG. 1 is a block diagram showing an exemplary embodiment of the present invention.
FIG. 2 conceptually shows an information table of bus use condition in an exemplary embodiment of the present invention.

FIG. 1 shows a computer for executing the bus arbitration method of the present invention, conceptually.

The computer shown in FIG. 1 includes a bus 10, an arbiter 20 for performing a bus arbitration between a plurality of devices A, B and C, which are depicted by reference numerals 31, 32 and 33, respectively, and connected to the bus 10 through the arbiter 20, and is capable of executing a plurality of tasks.

An assignment of the bus 10 (an arbitration of bus) to the respective devices A, B and C is performed by the arbiter 20 on the basis of an information table of bus use conditions to be described later. The arbiter 20 arbitrates the bus 10 between the devices by executing a bus arbitration program. In the following description, the bus 10 will be described without reference numeral thereof.

Now, the information table of bus use conditions will be described.

FIG. 2 shows the information table of bus use conditions in an embodiment of the present invention conceptually.

The information table defines the bus use conditions of the devices A to C, for determining an amount of use of the bus and a frequency of bus use of the respective devices A to C, with respect to the priority of tasks registered in the computer. The information table of bus use conditions includes items of IDs of the respective devices A to C, bus requests of the devices A to C, bus cycle numbers of continuous use of the devices A to C and execution periods thereof, etc., are described.

The respective items in the information table will be described.

The "bus request" is information indicative of whether or not there is a bus request from each of the devices. When there is the bus request, "existence" is recorded and, where there is no bus request, "absence" is recorded.

The "bus cycle number of continuous use (or continuous use number of bus cycles)" is information indicative of the maximum bus cycle number of continuous use, which can be started in one use of the bus assigned to a device. An amount of data, which can be transmitted or received, is increased in one bus assignment with increase of the bus cycle number of continuous use. Further, the bus cycle number of continuous use (the number of bus cycles of a device activated when the device uses the bus) is set to an integer times the minimum bus cycle number of a device.

The "execution period" is information indicative of frequency of bus assignment to a device.

In the information table shown in FIG. 2, the number of bus cycles capable of actuating, for example, the device A by one bus assignment is 4 and it is defined that the bus assignment to the device A is performed once per three times of circulation of the bus assignments to the three devices A, B and C in the order.

Similarly, in the case of the device B, the number of bus cycles capable of actuating the device B by one bus assignment is 16 and it is defined that the bus assignment to the device B is performed twice per two times of circulation of the bus assignments to the three devices A, B and C in the order. However, since there is no bus request from the device B, the bus assignment to the device B is not performed. Since there is no bus assignment to a device having no bus request, unnecessary bus assignment is blocked to thereby prevent degradation of the processing coefficient.

The information table is prepared such that the bus assignment is preferentially made to a device required to execute a task having high priority. A concrete preparation processing of the information table of bus use condition will be described later.

Next, a bus assignment operation of the arbiter 20 to the respective devices will be described.

Figure 3:
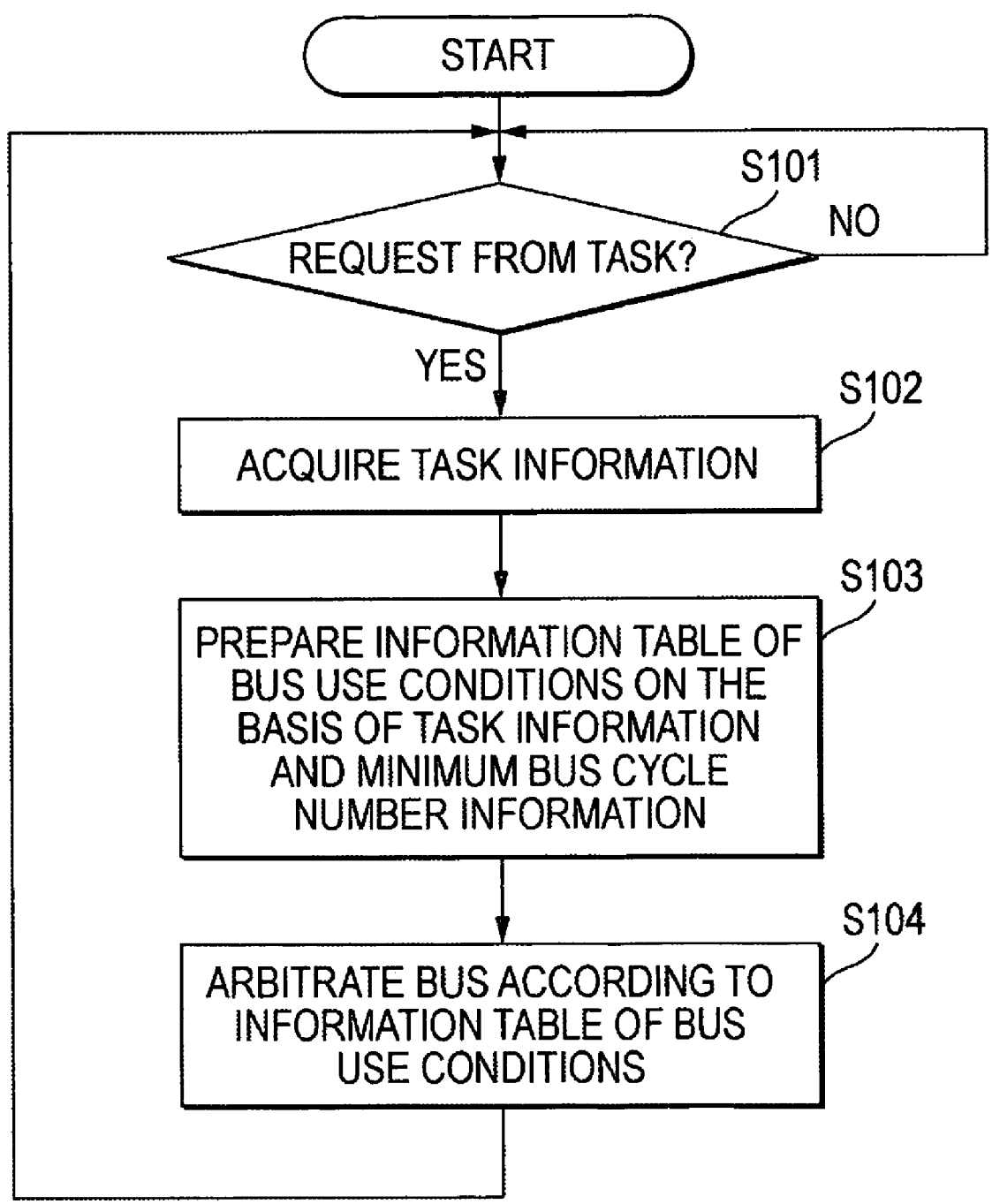
FIG. 3 is a flowchart showing a process of bus arbitration of an arbiter in an exemplary embodiment of the present invention.

FIG. 3 is a flowchart showing the procedure of the bus arbitration operation of the arbiter according to the embodiment of the present invention.

First, the arbiter 20, which executed a bus arbitration program after the computer is started, determines whether or not a bus request from a task registered in the computer exists (Step S101).

When there is the request from the task, the arbiter 20 acquires the task information of all of the tasks (each task has this task information) (Step S102) and prepares the information table of bus use condition on the basis of the thus acquired task information and the minimum bus cycle numbers of the respective devices A to C (Step S103).

The task information includes information of a task currently under execution, the priority of the task, devices necessary to execute the task and the usage rate indicative of rate of use of the respective devices in executing the task, etc. The request from the task is generated with such as timing with which the priority of the task is changed. The priority of task is defined by the number of bus cycles to be actuated in every unit time (for example, 1 second) in executing the task. The priority of task is high when the number of bus cycles is large.

Incidentally, the priority contained in the task information is dynamically changed during a booting-up of the computer. The arbiter 20 may lend weight to the task, which is under execution when the task information is acquired, such that the priority contained in the task information becomes highest. In such case, it is possible to preferentially assign the bus to the device used for the task under execution. This matter will be described in detail in the description of the preparation processing (2).

Then, the arbiter 20 arbitrates the bus use between devices according to the information table of bus use thus prepared (Step S104).

Incidentally, the timing, with which the task requests the arbiter 20 to arbitrate, is a time when the priority of the task is changed, when the computer is booted up, when the task is started or ended, when the task is switched or when the devices necessary to execute the task are updated, etc.

Although not described in the flowchart shown in FIG. 3, during the booting-up of the computer, the arbiter 20 always determines whether or not there is a request of bus from the devices A to C and updates the information "request of bus" of the information table according to a result of the determination. For example, the arbiter 20 updates the information "request of bus" in the information table to "existence" for the device requesting the bus and does not assign the bus to a device, which does not request the bus. That is, in the case of the information table shown in FIG. 2, the bus assignment to the devices A and C is made circularly. Therefore, it is possible to prevent assigning of bus to the device, which does not request the bus, to thereby prevent the processing efficiency from being lowered.

The concrete preparation processing of the information table of bus use conditions in the Step S103 will be described.

Preparation Processing (1)

A case where the information table is prepared on the basis of the "task information of all tasks" acquired with the timing "task is registered" will be described. In this embodiment, it is assumed that there are three registered tasks X, Y and Z.

FIG. 4 shows a portion of the task information acquired from the all tasks, conceptually.

The task information of the tasks X, Y and Z contains the usage rate of each of the devices A to C used to execute the respective tasks X, Y and Z and the amounts of bus use (the number of bus cycles), which are the priorities of the tasks X, Y and Z.

In the example shown in FIG. 4, three devices, the devices A, B and C, are used to execute the task X and the usage rates of the three devices A, B and C are 40%, 30% and 30%, respectively. The two devices A and B are used to execute the task Y and the usage rates of the two devices A and B are 60% and 40%, respectively. The two devices A and C are used to execute the task Z and the usage rates of the two devices A and C are 90% and 10%, respectively. Further, in FIG. 4, the task Y has the highest priority.

FIG. 5 shows information of the minimum number of bus cycles of the devices A, B and C, conceptually. The information shown in FIG. 5 is preliminarily stored in the computer.

The arbiter 20 calculates the bus cycle number of continuous use of the devices A, B and C on the basis of the task information shown FIG. 4 and the information of the minimum bus cycle number shown in FIG. 5.

First, a total amount of bus use (a sum of amounts of bus use of the tasks X, Y and Z) is calculated by using the following equation.

(total amount of bus use) = (amount of bus use for task $X$) + (amount of bus use for task $Y$) + (amount of bus use for task $Z$)

(In the task information in FIG. 4, it becomes 50 + 60 + 10 = 120.)

Then, the amounts of bus use of the devices A, B and C (the numbers of bus cycles actuated by the respective devices per unit time) are calculated by using the following equations.

(amount of bus use of device $A$) =

(bus usage rate of device $A$ for task $X$) ×

(amount of bus use for task $X$) +

(bus usage rate of device $A$ for task $Y$) ×

(amount of bus use for task $Y$) +

(bus usage rate of device $A$ for task $Z$) ×

(amount of bus use for task $Z$)

(In the task information in FIG. 4, it becomes 40% × 50 + 60% × 60 + 90% × 10 = 65)

(amount of bus use of device $B$) =

(bus usage rate of device $B$ for task $X$) ×

(amount of bus use for task $X$) +

(bus usage rate of device $B$ for task $Y$) ×

(amount of bus use for task $Y$) +

(bus usage rate of device $B$ for task $Z$) ×

(amount of bus use for task $Z$)

(In the task information in FIG. 4, it becomes 30% × 50 + 40% × 60 + 0% × 10 = 39)

(amount of bus use of device $C$) =

(bus usage rate of device $C$ for task $X$) ×

(amount of bus use for task $X$) +

(bus usage rate of device $C$ for task $Y$) ×

(amount of bus use for task $Y$) +

(bus usage rate of device $C$ for task $Z$) ×

(amount of bus use for task $Z$)

(In the task information in FIG. 4, it becomes 30% × 50 + 0% × 60 + 10% × 10 = 16)

Then, the bus usage rates of the devices A to C are calculated by using the following equations.

(bus usage rate of device $A$) =

(amount of bus use of device $A$) / (total amount of bus use)

(In the task information shown in FIG. 4, it becomes 65 / 120 = about 0.542)

(bus usage rate of device $B$) =

(amount of bus use of device $B$) / (total amount of bus use)

(In the task information shown in FIG. 4, it becomes 39 / 120 = about 0.325)

(bus usage rate of device $C$) =

(amount of bus use of device $C$) / (total amount of bus use)

(In the task information shown in FIG. 4, it becomes 16 / 120 = about 0.133)

Then, on the basis of the calculations above, the following simultaneous equations are solved. Incidentally, the equations are not always perfect simultaneous equations and numerical coefficients are determined such that the three equations are most closely related to each other.

$K \times$(bus usage rate of device $A$)=$Na \times$(minimum bus cycle number of device $A$)

$K \times$(bus usage rate of device $B$)=$Nb \times$(minimum bus cycle number of device $B$)

$K \times$(bus usage rate of device $C$)=$Nc \times$(minimum bus cycle number of device $C$)

Incidentally, the coefficients K, Na, Nb and Nc are integers and calculated such that coefficient K becomes as small as possible. In concrete, they are calculated by setting coefficient N (in this example, Nc) of the device having largest number of minimum bus cycles to 1.

(In cases of the task information shown in FIG. 4 and the minimum bus cycle number information shown in FIG. 5, K=244, Na=33 and Nb=5 when Nc is set to 1.)

The number of continuous use bus cycles is calculated as follows.

(bus cycle number of continuous use of device $A$) =

$Na \times$(minimum bus cycle number of device $A$)

(In this example, $33 \times 4 = 132$)

(bus cycle number of continuous use of device $B$) =

$Nb \times$(minimum bus cycle number of device $B$)

(In this example, $5 \times 16 = 80$)

(bus cycle number of continuous use of device $C$) =

$Nc \times$(minimum bus cycle number of device $C$)

(In this example, $1 \times 32 = 32$)

The arbiter 20 prepares the information table by using the bus cycle numbers of continuous use of the respective devices A, B and C thus calculated.

FIG. 6 shows the information table of bus use condition prepared by using the bus cycle numbers of continuous use thus calculated, conceptually.

Since all of the execution periods are 1 according to the information table, the assignment of bus is performed circularly in the order of the device A: 132 cycles, the device B: 80 cycles and the device C: 32 cycles. When the bus arbitration is performed according to this information table of bus use condition, the bus is assigned to the device A preferentially, so that it is possible to efficiently shorten the time up to the execution of the task Y having the highest priority.

Incidentally, although the bus cycle numbers of continuous use are assigned once in the information table shown in FIG. 6, it is possible to prepare the bus cycle number of continuous use by finely dividing the bus cycle number of continuous use to assign the bus to the devices in the minimum bus cycle number or a bus cycles number close to the minimum bus cycle number, as shown in FIG. 7, FIG. 8 or FIG. 9. Particularly, FIG. 9 shows an example of the information table in which the bus is assigned frequently to the devices by breaking the bus cycle number of continuous use to the minimum bus cycle number. It may be preferable practically to change the bus cycle number of continuous use by changing the execution period. Incidentally, the item of the bus request is omitted in the tables shown in FIG. 6 to FIG. 9.

Preparation Processing (2)

A case where the information table is prepared after weighting the priority (amount of bus use) of the respective tasks contained in the "task information of all tasks" acquired with the timing "task switching" such that the priority of the task currently under execution becomes highest. In this case, the arbiter 20 appropriately weights the "amount of bus use" contained in the task currently under execution. Here, explanation is made for the case where the task currently under execution at the time of acquisition of the task information is the task X.

FIG. 10 conceptually shows a task information when the amount of bus use for the task X currently under execution in the task information of the three tasks acquired in the preparation processing (1) (refer to FIG. 4) is weighted.

As shown in FIG. 10, the amount of bus use for the task X, which is 50 in FIG. 4, is increased by 50% to 75, the amounts of bus use for the tasks Y and Z, which are 60 and 10 in FIG. 4, are reduced by 50% to 30 and 5, respectively. The arbiter 20 calculates the bus cycle number of continuous use on the basis of the task information shown FIG. 10 and the information of the minimum bus cycle number shown in FIG. 5, similarly to the preparation processing (1).

First, a total amount of bus use (a sum of amounts of bus use for the tasks X, Y and Z) is calculated by using the following equation.

(total amount of bus use) = (amount of bus use for task $X$) +

(amount of bus use for task $Y$) + (amount of bus use for task $Z$)

(In the task information in FIG. 10, it becomes $75 + 30 + 5 = 110$)

Then, the amounts of bus use of the devices A, B and C (the numbers of bus cycles actuated by the devices per unit time) are calculated by using the following equations.

(amount of bus use of device $A$) =

(bus usage rate of device $A$ for task $X$) ×

(amount of bus use for task $X$) +

(bus usage rate of device $A$ for task $Y$) ×

(amount of bus use for task $Y$) +

(bus usage rate of device $A$ for task $Z$) ×

(amount of bus use for task $Z$)

(In the task information in FIG. 10, it becomes $40\% \times 75 + 60\% \times 30 + 90\% \times 5 = 52.5$)

(amount of bus use of device $B$) =

(bus usage rate of device $B$ for task $X$) ×

(amount of bus use for task $X$) +

(bus usage rate of device $B$ for task $Y$) ×

(amount of bus use for task $Y$) +

(bus usage rate of device $B$ for task $Z$) ×

(amount of bus use for task $Z$)

-continued (In the task information in FIG. 10, it becomes $30\% \times 75 + 40\% \times 30 + 0\% \times 5 = 34.5$)

(amount of bus use of device $C$) =

(bus usage rate of device $C$ for task $X$) ×

(amount of bus use for task $X$) +

(bus usage rate of device $C$ for task $Y$) ×

(amount of bus use for task $Y$) +

(bus usage rate of device $C$ for task $Z$) ×

(amount of bus use for task $Z$)

(In the task information in FIG. 10, it becomes $30\% \times 75 + 0\% \times 30 + 10\% \times 5 = 23$)

Then, the bus usage rates of the devices A to C are calculated by using the following equations.

(bus usage rate of device $A$) =

(amount of bus use of device $A$)/(total amount of bus use)

(In the task information shown in FIG. 10, it becomes $52.5/110$ = about $0.477$)

(bus usage rate of device $B$) =

(amount of bus use of device $B$)/(total amount of bus use)

(In the task information shown in FIG. 10, it becomes $34.5/110$ = about $0.314$)

(bus usage rate of device $C$) =

(amount of bus use of device $C$)/(total amount of bus use)

(In the task information shown in FIG. 10, it becomes $23/110$ = about $0.209$)

Then, on the basis of the calculations above, the following simultaneous equations are solved. Incidentally, the equations are not always perfect simultaneous equations and numerical coefficients are determined such that the three equations are most closely related to each other.

$K \times$(bus usage rate of device $A$)=$Na \times$(minimum bus cycle number of device $A$)

$K \times$(bus usage rate of device $B$)=$Nb \times$(minimum bus cycle number of device $B$)

$K \times$(bus usage rate of device $C$)=$Nc \times$(minimum bus cycle number of device $C$)

(In cases of the task information shown in FIG. 10 and the minimum bus cycle number information shown in FIG. 5, $K=151$, $Na=18$ and $Nb=3$ when $Nc$ is set to 1.)

The number of continuous use bus cycles is calculated as follows.

(bus cycle number of continuous use of device $A$) =

$Na \times$(minimum bus cycle number of device $A$)

(In this example, $18 \times 4 = 72$)

-continued (bus cycle number of continuous use of device $B$) =

$Nb \times$(minimum bus cycle number of device $B$)

(In this example, $3 \times 16 = 48$)

(bus cycle number of continuous use of device $C$) =

$Nc \times$(minimum bus cycle number of device $C$)

(In this example, $1 \times 32 = 32$)

The arbiter 20 prepares the information table by using the bus cycle numbers of continuous use thus calculated.

FIG. 11 conceptually shows the information table prepared by using the bus cycle numbers of continuous use thus calculated as above.

Since all of the execution periods are 1 according to this information table shown in FIG. 11, the assignment of bus is performed circularly in the order of the device A: 72 cycles, the device B: 48 cycles and the device C: 32 cycles. Comparing FIG. 11 with FIG. 6, while the bus is preferentially assigned to the device A according to this information table shown in FIG. 6, the bus is assigned to the devices A to C equally according to the information table shown in FIG. 11. Since the task X uses the devices A to C equally according to the information table shown in FIG. 11, it is possible to further shorten the execution time of the task X compared with the information table shown in FIG. 6.

FIG. 12 conceptually shows the information table of bus use condition in which the bus is assigned frequently to the devices by finely breaking the bus cycle number of continuous use to the minimum bus cycle number. Incidentally, the item of presence or absence of the bus use request in the tables shown in FIGS. 11 and 12 is omitted.

As described, according to the computer of the embodiments of the present invention, the information table of bus use conditions is prepared such that the bus is preferentially assigned to the device for executing the task having the highest priority and the bus arbitration is performed according to this table. That is, although the tasks are executed in the order of the requests, it is possible to shorten the time up to an execution of high priority task or to an end of the execution of the task to thereby improve the processing efficient, by assigning the bus to a device executing high priority task more efficiently.

Incidentally, it is possible to divide a task. In such case, the division of task may be performed correspondingly to the access frequency of the device used for the task to the bus, correspondingly to every device or correspondingly to a process time of the task.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-256679 filed Sep. 5, 2005, the contents of which is incorporated herein by reference.

What is claimed is:

1. A method for arbitrating a bus between a plurality of devices connected to the bus in a computer for executing a plurality of tasks by the devices, the method comprising:

acquiring a task information at a timing, the task information including a priority of each of the tasks and a usage rate of each of the devices for executing each of the tasks;

producing an information of a bus use condition of each of the devices on a basis of the priority of each of the tasks and the usage rate so that the bus is preferentially assigned to a device necessary to execute a task having a priority higher than priorities of other tasks; and arbitrating the bus between the devices according to the information of the bus use condition, wherein the priority of each of the tasks is defined by a number of bus cycles activated per unit time in executing the task.

2. The method for arbitrating a bus according to claim 1, wherein the producing of the information of the bus use condition comprises:

calculating a bus usage rate of each of the devices on a basis of the number of bus cycles activated per unit time in executing the task and a frequency of bus assignment to said each of the devices, wherein the bus usage rate of a device is a ratio of the number of bus cycles to be activated by the device per unit time to a total number of bus cycles of the plurality of the tasks;

calculating a continuous use number of bus cycles on a basis of the bus usage rate and a minimum number of bus cycles activated by a device, wherein the continuous use number is a maximum number of bus cycles activated by a device in one use of the bus assigned to the device; and producing the information of the bus use condition on a basis of the continuous use number of bus cycles.

3. The method for arbitrating a bus according to claim 2, wherein the continuous use number of bus cycles comprises an integer times the minimum number of bus cycles of a device.

4. The method for arbitrating a bus according to claim 2, wherein information on said minimum number of bus cycles is preliminarily stored in the computer.

5. The method for arbitrating a bus according to claim 1, further comprising determining whether each of the devices has a request of use of the bus.

6. The method for arbitrating a bus according to claim 1, wherein the timing comprises a timing at which the priority is changed.

7. The method for arbitrating a bus according to claim 1, further comprising setting the priority in such a way that a task which is under execution at a time when the task information is acquired has a highest priority.

8. The method for arbitrating a bus according to claim 1, wherein said timing comprises one of a timing:

when the computer is booted up;
when the task is started or ended;
when the task is switched; and
when devices necessary to execute the task are updated.

9. The method for arbitrating a bus according to claim 1, wherein said task information further comprises information on devices required to execute the task.

10. The method for arbitrating a bus according to claim 1, wherein said usage rate indicates a rate of use of respective devices in executing the task.

11. The method for arbitrating a bus according to claim 1, wherein a division of a task is performed based on an access frequency of a device used for said each of said tasks to the bus.

12. The method for arbitrating a bus according to claim 1, wherein a division of a task is performed based on a process time of said each of said tasks.

13. The method for arbitrating a bus according to claim 1, wherein the producing of the information of the bus use condition comprises:

calculating a bus usage rate of each of the devices on a basis of the number of bus cycles activated per unit time in executing the task and a frequency of bus assignment to said each of the devices.

14. The method for arbitrating a bus according to claim 13, wherein the bus usage rate of a device is a ratio of a number of bus cycles activated by the device per unit time to a total number of bus cycles of the plurality of the tasks.

15. The method for arbitrating a bus according to claim 1, wherein the producing of the information of the bus use condition comprises:

calculating a continuous use number of bus cycles on a basis of the bus usage rate and a minimum number of bus cycles activated by a device.

16. The method for arbitrating a bus according to claim 15, wherein the continuous use number is a maximum number of bus cycles activated by a device in one use of the bus assigned to the device.

17. The method for arbitrating a bus according to claim 1, wherein the producing of the information of the bus use condition comprises:

producing the information of the bus use condition based on a continuous use number of bus cycles.

18. A computer-readable medium including a set of instructions for arbitrating a bus between a plurality of devices connected to the bus in a computer for executing a plurality of tasks by the devices, the instructions comprising:

acquiring a task information at a timing, the task information including a priority of each of the tasks and a usage rate of each of the devices for executing each of the tasks;

producing an information of a bus use condition of each of the devices on a basis of the priority of each of the tasks and the usage rate so that the bus is preferentially assigned to a device necessary to execute a task having a priority higher than priorities of other tasks; and arbitrating the bus between the devices according to the information of the bus use condition, wherein the priority of each of the tasks is defined by a number of bus cycles activated per unit time in executing the task.

19. A method for arbitrating a bus between a plurality of devices connected to the bus in a computer executing a plurality of tasks by the devices, the method comprising:

acquiring a task information at a timing when the task is started, said task information including a priority of each of the tasks and a usage rate of each of the devices for executing each of the tasks;

producing an information of a bus use condition of each of the devices on a basis of the priority of each of the tasks and the usage rate so that the bus is preferentially assigned to a device necessary to execute a task having a priority higher than priorities of other tasks; and arbitrating the bus between the devices according to the information of the bus use condition, wherein the priority of each of the tasks is defined by a number of bus cycles activated per unit time in executing the task, and wherein the producing of the information of the bus use condition comprises:

calculating a bus usage rate of each of the devices on a basis of the number of bus cycles activated per unit time in executing the task and a frequency of bus assignment to said each of the devices, wherein the bus usage rate of a device is a ratio of the number of bus cycles to be activated by the device per unit time to a total number of bus cycles of the plurality of the tasks; and calculating a continuous use number of bus cycles on a basis of the bus usage rate and a minimum number of bus cycles activated by a device, wherein the continuous use number is a maximum number of bus cycles activated by a device in one use of the bus assigned to the device.

20. The method for arbitrating a bus according to claim 19, further comprising setting the priority in such a way that a task which is under execution at a time when the task information is acquired has a highest priority.

* * * * *